(12) United States Patent
Shimoda

(10) Patent No.: US 7,954,149 B2
(45) Date of Patent: *May 31, 2011

(54) IMAGE FORMING APPARATUS, CONTROL METHOD OF THE APPARATUS, AND CONTROL PROGRAM OF THE APPARATUS

(75) Inventor: Koichi Shimoda, Mishima (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 1106 days.

This patent is subject to a terminal disclaimer.

(21) Appl. No.: 11/688,531

(22) Filed: Mar. 20, 2007

(65) Prior Publication Data

US 2008/0235787 A1 Sep. 25, 2008

(51) Int. Cl.
*G06F 7/04* (2006.01)
*G06F 12/14* (2006.01)
*G11C 7/00* (2006.01)

(52) U.S. Cl. .......... 726/20; 713/172

(58) Field of Classification Search .......... 726/17, 726/20; 713/172
See application file for complete search history.

(56) References Cited

U.S. PATENT DOCUMENTS

| | | | | |
|---|---|---|---|---|
| 5,055,658 A * | 10/1991 | Cockburn | .......... | 235/382 |
| 5,377,269 A * | 12/1994 | Heptig et al. | .......... | 726/20 |
| 5,768,382 A * | 6/1998 | Schneier et al. | .......... | 380/251 |
| 6,128,741 A * | 10/2000 | Goetz et al. | .......... | 726/20 |
| 6,229,882 B1 * | 5/2001 | Nunokawa et al. | .......... | 379/88.22 |
| 6,317,836 B1 * | 11/2001 | Goren et al. | .......... | 726/36 |
| 6,449,651 B1 * | 9/2002 | Dorfman et al. | .......... | 709/229 |
| 6,470,082 B1 * | 10/2002 | Nunokawa et al. | .......... | 379/357.01 |
| 6,523,119 B2 * | 2/2003 | Pavlin et al. | .......... | 713/192 |
| 6,651,877 B2 * | 11/2003 | Fukuda et al. | .......... | 235/375 |
| 7,353,399 B2 * | 4/2008 | Ooi et al. | .......... | 713/186 |
| 7,363,507 B2 * | 4/2008 | Rick | .......... | 713/189 |
| 7,373,657 B2 * | 5/2008 | Walker | .......... | 726/4 |
| 7,443,527 B1 * | 10/2008 | Shigeeda | .......... | 358/1.15 |
| 7,576,883 B2 * | 8/2009 | Ragnet et al. | .......... | 358/1.15 |
| 7,667,865 B2 * | 2/2010 | Ciriza et al. | .......... | 358/1.15 |
| 7,764,401 B2 * | 7/2010 | Miyata | .......... | 358/1.9 |
| 7,839,515 B2 * | 11/2010 | Shigeeda | .......... | 358/1.14 |
| 2001/0056539 A1 * | 12/2001 | Pavlin et al. | .......... | 713/193 |
| 2002/0087870 A1 * | 7/2002 | Rick | .......... | 713/189 |
| 2002/0137565 A1 * | 9/2002 | Blanco | .......... | 463/46 |
| 2003/0110388 A1 * | 6/2003 | Pavlin et al. | .......... | 713/190 |
| 2003/0228911 A1 * | 12/2003 | Dernis et al. | .......... | 463/43 |
| 2004/0181695 A1 * | 9/2004 | Walker | .......... | 713/202 |
| 2004/0261097 A1 * | 12/2004 | Hanks | .......... | 725/29 |
| 2005/0026700 A1 * | 2/2005 | Blanco | .......... | 463/43 |

(Continued)

FOREIGN PATENT DOCUMENTS

JP 2004-130561 4/2004

(Continued)

*Primary Examiner* — David Garcia Cervetti
(74) *Attorney, Agent, or Firm* — Turocy & Watson, LLP

(57) ABSTRACT

When an enabler key 10 is inserted in the main body 1, an overwrite mode for overwriting new data on existing data in a hard disk drive 25 is set. When the enabler key 10 is removed from the main body 1, the overwrite mode is released. During startup of the main body 1 and at every fixed time t1 after the startup of the main body 1, presence or absence of insertion of the enabler key 10 is detected. When a result of this detection changes from "present" to "absent", the main body 1 is stopped.

20 Claims, 3 Drawing Sheets

U.S. PATENT DOCUMENTS

| | | | |
|---|---|---|---|
| 2005/0036795 A1* | 2/2005 | Karagiannis et al. | 399/27 |
| 2005/0047812 A1* | 3/2005 | Takemura | 399/75 |
| 2005/0069128 A1* | 3/2005 | Inoue et al. | 380/42 |
| 2005/0102518 A1* | 5/2005 | Wada | 713/168 |
| 2005/0130745 A1* | 6/2005 | Dernis et al. | 463/43 |
| 2005/0137018 A1* | 6/2005 | Dernis et al. | 463/43 |
| 2005/0139668 A1* | 6/2005 | Trippe et al. | 235/440 |
| 2006/0152751 A1 | 7/2006 | Shimoda et al. | |
| 2006/0242697 A1* | 10/2006 | Takemura | 726/19 |
| 2007/0061024 A1* | 3/2007 | Ceskutti | 700/86 |
| 2007/0216941 A1* | 9/2007 | Jingu | 358/1.15 |
| 2007/0222810 A1* | 9/2007 | Okuda | 347/19 |
| 2007/0255949 A1* | 11/2007 | Miyazaki et al. | 713/165 |
| 2008/0037054 A1* | 2/2008 | Hasegawa et al. | 358/1.15 |
| 2008/0101613 A1* | 5/2008 | Brunts et al. | 380/279 |
| 2008/0180244 A1* | 7/2008 | Howarth et al. | 340/568.1 |
| 2008/0181650 A1* | 7/2008 | Matsui | 399/80 |
| 2009/0009792 A1* | 1/2009 | Zimmerman et al. | 358/1.15 |

FOREIGN PATENT DOCUMENTS

JP  2005-033277  2/2005

* cited by examiner

IMAGE FORMING APPARATUS, CONTROL METHOD OF THE APPARATUS, AND CONTROL PROGRAM OF THE APPARATUS

BACKGROUND OF THE INVENTION

1. Field of the Invention

The present invention relates to a complex image forming apparatus having plural functions, a control method of the apparatus, and a control program of the apparatus.

2. Description of the Related Art

There is a complex image forming apparatus (referred to as MFP) having plural functions such as a scan function and a network print function other than the normal copy function. This complex image forming apparatus is mounted with a storing unit for storing image data and the like, for example, a hard disk drive.

In the image forming apparatus, an overwrite mode is prepared as security means for preventing deficiency in that existing data stored in the hard disk drive is read and leaks to the outside. Once this overwrite mode is set, when new data is stored in the hard disk drive, the new data is overwritten on the existing data in the hard disk drive. The existing data is erased by this overwriting. According to this erasure, it is possible to prevent the deficiency in that the existing data in the hard disk drive is read and leaks to the outside.

As means for designating setting and release of such an overwrite mode, an enabler key is prepared. When this enabler key is inserted in a main body of the image forming apparatus, the overwrite mode is set. When the enabler key is removed from the main body of the image forming apparatus, the overwrite mode is released.

However, anybody can remove the enabler key from the main body of the image forming apparatus.

Therefore, any person attempting to steal the existing data in the hard disk drive can remove the enabler key from the main body and easily steal the existing data in the hard disk drive.

BRIEF SUMMARY OF THE INVENTION

It is an object of an aspect of the invention to provide an image forming apparatus excellent in security that can prevent a situation in which existing data in a storing unit is stolen.

An image forming apparatus according to an aspect of the invention includes:

a data storing unit;

an enabler key insertable in and removable from the apparatus;

a first control unit that sets, when the enabler key is inserted in the apparatus, an overwrite mode for overwriting new data on existing data in the data storing unit and releases the overwriting mode when the enabler key is removed; and a second control unit that detects presence or absence of insertion of the enabler key during startup of the apparatus and at every fixed time after the startup of the apparatus and stops the apparatus when a result of the detection changes from present to absent.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiment given below, serve to explain the principles of the invention.

DETAILED DESCRIPTION OF THE INVENTION

An embodiment of the invention will be hereinafter explained with reference to the drawings.

Figure 1:
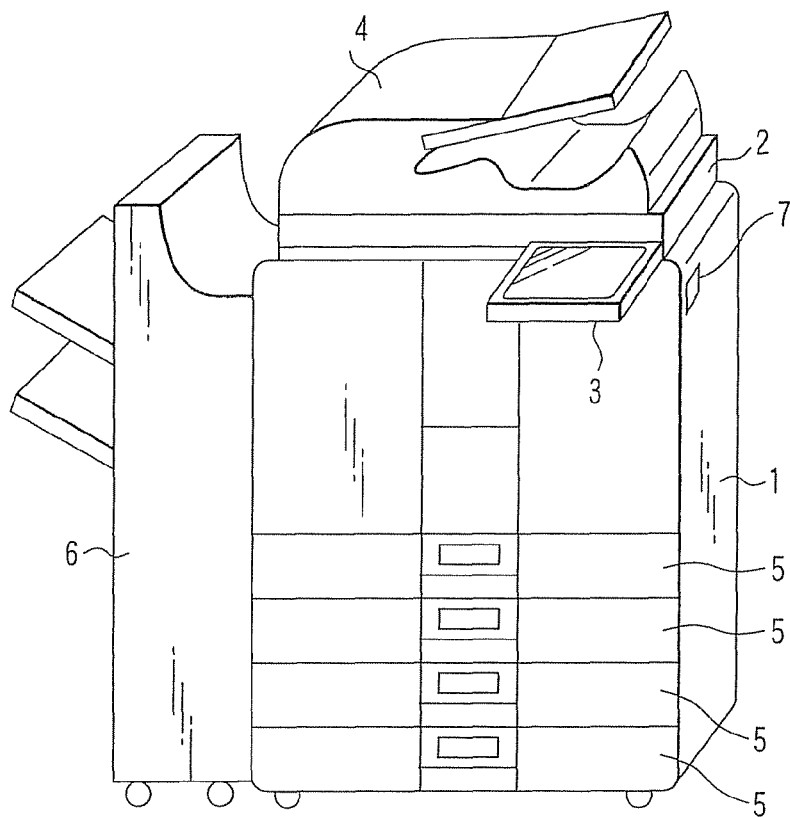
FIG. 1 is a perspective view of an external appearance of an embodiment viewed from a front side thereof.
Figure 2:
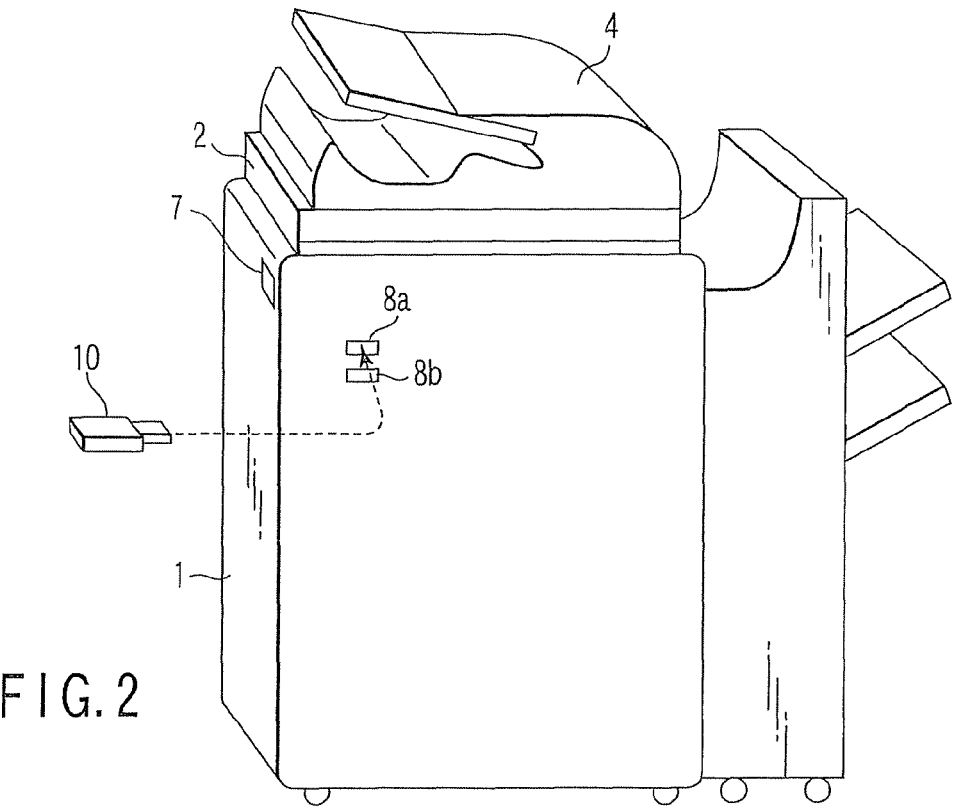
FIG. 2 is a perspective view of the external appearance of the embodiment viewed from a rear side thereof.

As shown in FIGS. 1 and 2, an original stand 2 and a control panel 3 are provided in an upper part of a main body 1 of a complex image forming apparatus having plural functions. An automatic document feeder (ADF) 4 is provided on the original stand 2 to be freely opened and closed. The control panel 3 includes a start key, a ten key, and a display screen of a touch panel type.

Plural cassettes 5 having paper sheets of various sizes stored therein are provided in a lower part of the main body 1. A sheet discharge unit 6 that receives discharge of a printed paper sheet is provided on a side of the main body 1.

A power switch 7 is provided on the other side of the main body 1.

USB ports 8a and 8b are provided in the other back of the main body 1. It is possible to insert the enabler key 10 in and remove the enabler key 10 from each of the USB ports 8a and 8b. The enabler key 10 has a ROM 11 and a USB interface 12. Identification data peculiar to the enabler key 10 is stored in the ROM 11.

Figure 3:
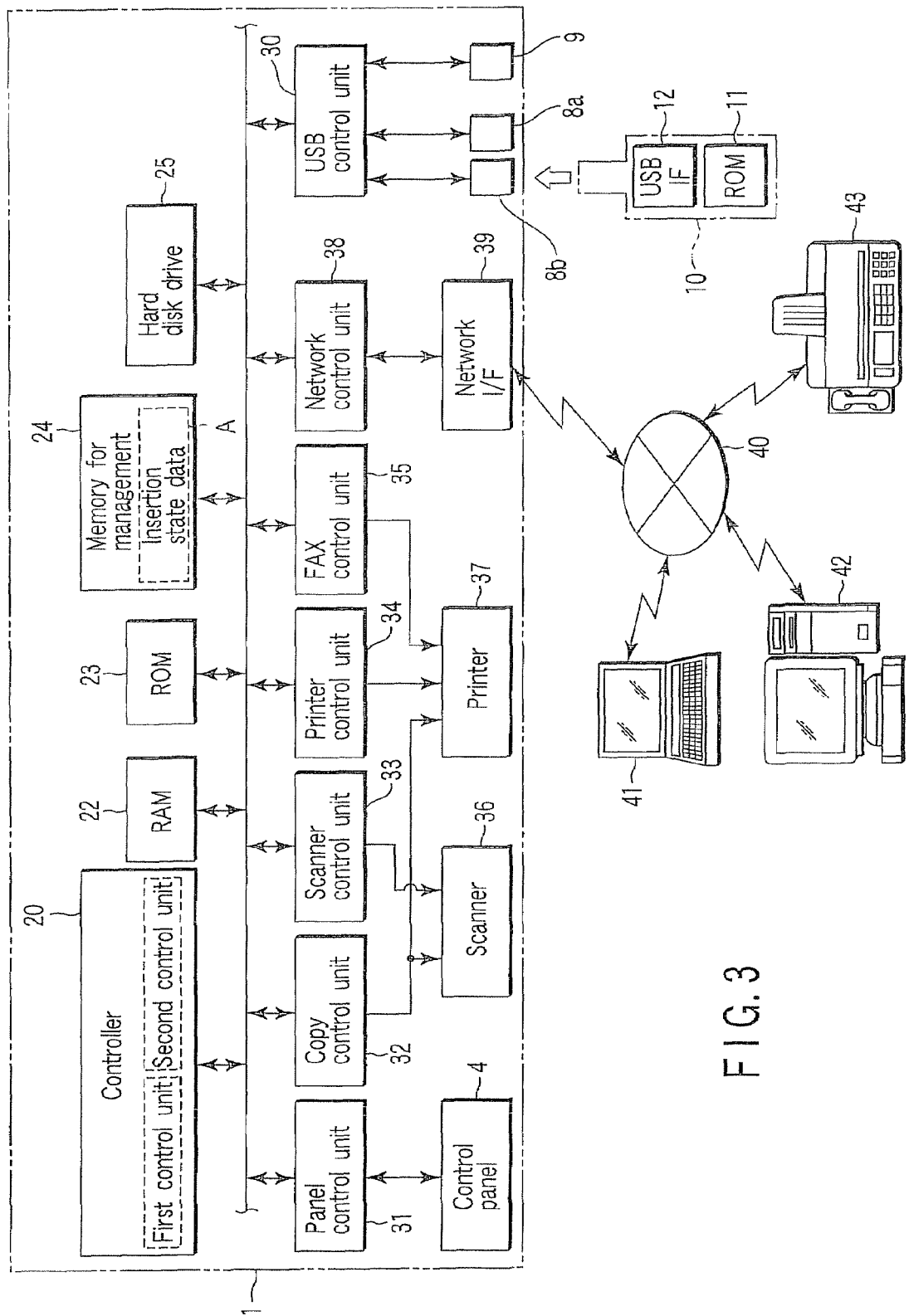
FIG. 3 is a block diagram of a control circuit of the embodiment.

As shown in FIG. 3, a controller 20 is provided in the main body 1. A RAM 22, a ROM 23, a nonvolatile memory for management 24, a hard disk drive 25 as a large capacity data storing unit, a USB control unit 30, a panel control unit 31, a copy control unit 32, a scanner control unit 33, a printer control unit 34, a facsimile (FAX) control unit 35, and a network control unit 38 are connected to this controller 20.

The USB control unit 30 reads the identification data from the enabler key 10 set in one of the USB ports 8a and 8b. The RAM 22 is a memory for storage of various data. The ROM 23 has stored therein a control program for the controller 20. An insertion state data A indicating an insertion state of the enabler key 10 described later is stored in the memory for management 24. Image data scanned in the main body 1, image data sent from other image forming apparatuses, and the like are stored in the hard disk drive 25.

The panel control unit 31 controls the control panel 3. The copy control unit 32 controls the normal copy function employing a scanner 36 and a printer 37. The scanner control unit 33 controls scan functions (a scan-to-box function, a scan-to-file function, and a scan-to-E-mail function) employing the scanner 36. The printer control unit 34 controls a network print function employing the printer 37. The facsimile control unit 35 controls a facsimile function employing the printer 36.

The network control unit 38 controls data transmission and reception between the image forming apparatus and an external apparatus via a network interface 39. The network interface 39 includes a LAN board, a FAX modem, and the like and is connected to personal computers 41 and 42, a facsimile apparatus 43, and the like as external apparatuses via an external communication line 40.

The controller 20 includes a first control unit and a second control unit.

The first control unit sets, when the enabler key 10 is inserted in the main body 1, an overwrite mode for overwriting new data on existing data in the hard disk drive 25 and releases the overwrite mode when the enabler key 10 is removed from the main body 1

The second control unit detects presence or absence of insertion of the enabler key 10 during startup of the main body 1 and at every fixed time after the startup of the main body 1, monitors a change in a result of the detection according to comparison of the result of the detection and the insertion state data A in the memory for management 24. When the result of the detection changes from "present" to "absent", the second control unit stops the main body 1 and displays an indication of call for a serviceman for the main body 1 on a liquid crystal display screen of the control panel 3. This result of the detection by the second control unit is stored for update in the memory for management 24 as the insertion state data A.

Figure 4:
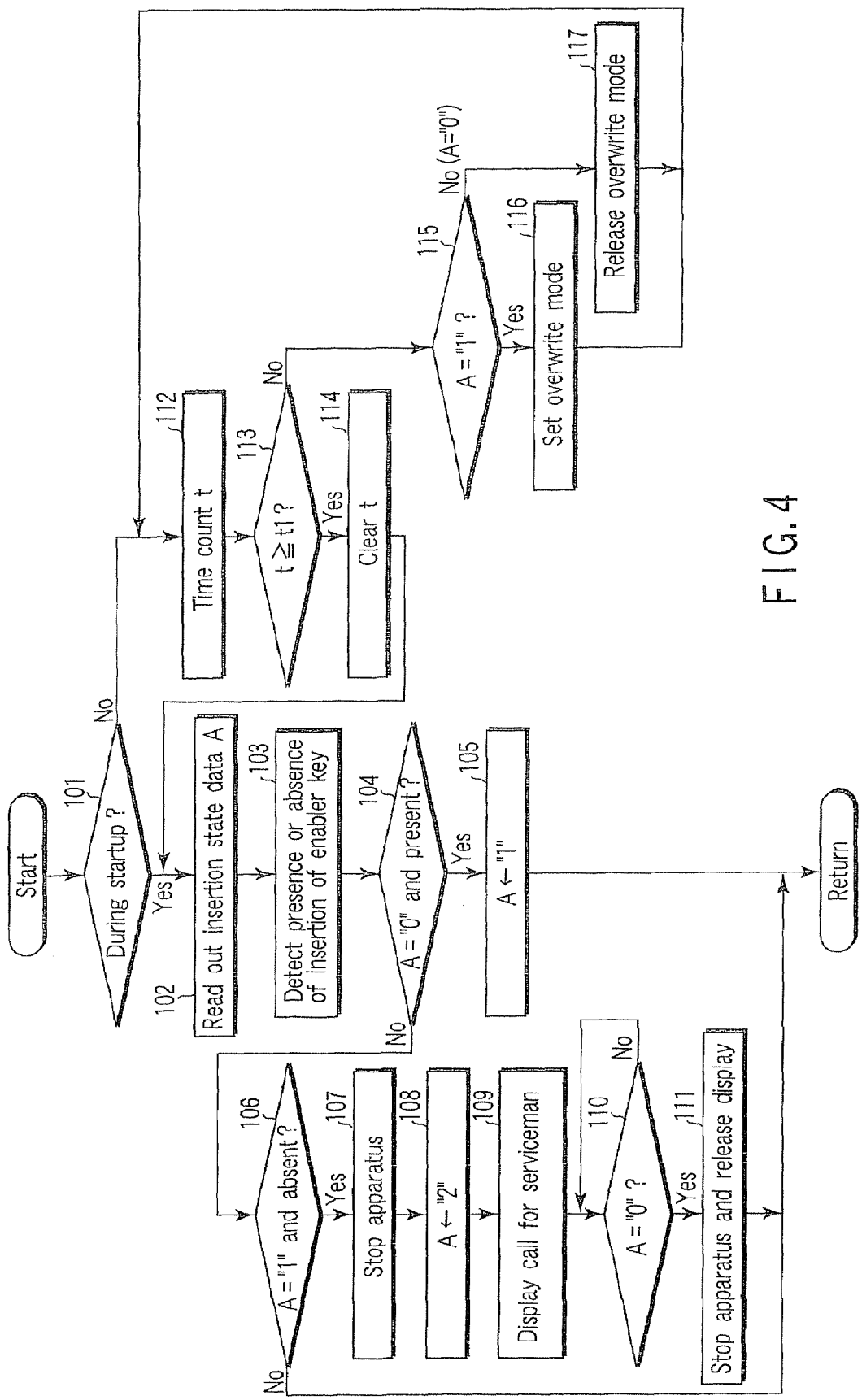
FIG. 4 is a flowchart for explaining actions of the embodiment.

Actions will be explained with reference to a flowchart in FIG. 4.

When the power switch 7 of the main body 1 is turned on, the main body 1 is started up. During this startup (YES in step 101), the insertion state data A in the memory for management 24 is read out (step 102) and presence or absence of the insertion of the enabler key 10 in the USB ports 8a and 8b is detected (step 103).

Three numbers "0", "1", and "2" are prepared as the insertion state data A. "0" indicates that the enabler key 10 is not inserted. "1" indicates that the enabler key 10 is inserted. "2" indicates that the enabler key 10 is removed.

When the insertion state data A is "0" and the insertion of the enabler key 10 is "present" (YES in step 104), i.e., when the enabler key 10 not inserted is inserted anew, the insertion state data A is updated from "0" to "1" (step 105).

When the insertion state data A is "0" and the insertion of the enabler key 10 is "absent" (YES in step 104 and NO in step 106), i.e., when a non-insertion state of the enabler key 10 continues, the insertion state data A is not updated from "0".

However, when the insertion state data A is "1" and the insertion of the enabler key 10 is "absent" (NO in step 104 and YES in step 106), i.e., when the inserted enabler key 10 is removed, the main body 1 is stopped (step 107).

The stop of the main body 1 makes it impossible to read the existing data in the hard disk drive 25. Therefore, even if a person attempting to steal the existing data in the hard disk drive 25 removes the enabler key 10, the person cannot steal the existing data in the hard disk drive 25. In other words, it is possible to prevent leakage of the data and secure high security.

Simultaneously with this stop of the main body 1, the insertion state data A is updated from "1" to "2" (step 108) and an indication of call for a serviceman for the main body 1 is displayed on the liquid crystal display screen of the control panel 3 (step 109). The user calls the serviceman in accordance with the display on the liquid crystal display screen of the control panel 3.

When the called serviceman sets a self-diagnosis mode on the control panel 3, the insertion state data A="2" is displayed on the liquid crystal display screen of the control panel 3. When this insertion state data A displayed is changed to "0" according to operation by the serviceman (YES in step 110), the stop of the main body 1 is released and the display of the call and the display of the insertion state data A on the liquid crystal display screen of the control panel 3 are released (step 111).

On the other hand, after the startup of the main body 1 (NO in step 101), time count t is executed (step 112). While this time count t does not reach a fixed time t1 set in advance (NO in step 113), the insertion state data A is discriminated (step 115).

When the insertion state data A is "1" (YES in step 115), the overwrite mode is set (step 116). Once the overwrite mode is set, when new data is stored in the hard disk drive 25, the new data is overwritten on the existing data in the hard disk drive 25. According to this overwrite, the existing data is erased.

When the insertion state data A is "0" (NO in step 115), the overwrite mode is released (step 117). Once the overwrite mode is released, when new data is stored in the hard disk drive 25, the new data is stored following the existing data in the hard disk 25.

When the time count t reaches the fixed time t1 (YES in step 113), the time count t is cleared (step 114). The insertion state data A in the memory for management 24 is read out (step 102) and presence or absence of insertion of the enabler key 10 in the USB ports 8a and 8b is detected (step 103).

When the insertion state data A is "0" and the insertion of the enabler key 10 is "present" (YES in step 104), i.e., the enabler key 10 not inserted is inserted anew, the insertion state data A is updated from "0" to "1" (step 105).

When the insertion state data A is "0" and the insertion of the enabler key 10 is "absent" (YES in step 104 and NO in step 106), i.e., when the non-insertion state of the enabler key 10 continues, the insertion state data A is not updated from "0".

However, when the insertion state data A is "1" and the insertion of the enabler key 10 is "absent" (NO in step 104 and YES in step 106), i.e., the inserted enabler key 10 is removed, the main body 1 is stopped (step 107).

The stop of the main body 1 makes it impossible to read the existing data in the hard disk drive 25. Therefore, even if a person attempting to steal the existing data in the hard disk drive 25 removes the enabler key 10, the person cannot steal the existing data in the hard disk drive 25. In other words, it is possible to prevent leakage of the data and secure high security.

Simultaneously with this stop of the main body 1, the insertion state data A is updated from "1" to "2" (step 108) and an indication of call for a serviceman for the main body 1 is displayed on the liquid crystal display screen of the control panel 3 (step 109). The user calls the serviceman in accordance with the display on the liquid crystal display screen of the control panel 3.

When the called serviceman sets a self-diagnosis mode on the control panel 3, the insertion state data A="2" is displayed on the liquid crystal display screen of the control panel 3. When this insertion state data A displayed is changed to "0" according to operation by the serviceman (YES in step 110), the stop of the main body 1 is released and the display of the call for a serviceman and the display of the insertion state data A on the liquid crystal display screen of the control panel 3 are released (step 111).

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus comprising:
a data storing section;
a detection section configured to detect a presence or an absence of an enabler key insertable in and removable from the apparatus; and
a control section configured to overwrite new data, to be stored in the data storing section, on existing data in the data storing section and to store the new data therein when a result of a detection by the detection section indicates presence of the enabler key, to store new data in the data storing section without overwriting the new data on existing data in the data storing section when the result of the detection by the detection section indicates absence of the enabler key continuously from a startup of the apparatus, and to stop the apparatus when the result of the detection by the detection section changes from presence of the enabler key to absence of the enabler key after startup of the apparatus.

2. The image forming apparatus of claim 1, further comprising:
a control panel comprising a display screen, wherein
the control section displays an indication to call for a serviceman for the apparatus, on the display of the control panel, when the result of the detection by the detection section is a change from presence of the enabler key to absence of the enabler key after startup of the apparatus.

3. The image forming apparatus of claim 1, further comprising:
a state storing section configured to store insertion state data indicating an insertion state of the enabler key, wherein
the control section stores the result of the detection by the detection section in the state storing section as the insertion state data.

4. The image forming apparatus of claim 3, wherein
the insertion state data comprise first insertion state data indicating that the result of the detection by the detection section is a presence of the enabler key, second insertion state data indicating that the result of the detection by the detection section is an absence of the enabler key, or third insertion state data indicating that the result of the detection by the detection section is a change from presence of the enabler key to absence of the enabler key.

5. The image forming apparatus of claim 4, further comprising:
a control panel comprising a display screen, wherein
the control section displays an indication to call for a serviceman for the apparatus, on the display screen of the control panel, when the result of the detection by the detection section changes from presence of the enabler key to absence of the enabler key after startup of the apparatus.

6. The image forming apparatus of claim 5, wherein
the control section reads the insertion state data from the state storing section at startup of the apparatus, monitors a change in the insertion state of the enabler key based on a comparison between the read insertion state data and the result of the detection by the detection section, overwrites new data to be stored in the data storing section on existing data in the data storing section and stores the data therein when a monitored result indicates a change from absence of the enabler key to presence of the enabler key, stores new data in the data storing section without overwriting the new data on existing data in the data storing section when the monitored result indicates absence of the enabler key which continues from startup of the apparatus, and stops the apparatus and displays an indication to call for a serviceman of the apparatus on the display screen of the control panel when the monitored result indicates a change from presence of the enabler key to absence of the enabler key.

7. The image forming apparatus of claim 1, wherein
the data storing section is a hard disk drive, and
the enabler key is connected to at least one USB port in a main body of the apparatus.

8. A control method of an image forming apparatus including a data storing section, the control method comprising:
detecting presence or absence of an enabler key insertable in and removable from the apparatus; and
overwriting new data, to be stored in the data storing section, on existing data in the data storing section and storing the data therein when a result of detecting indicates presence of the enabler key, storing new data in the data storing section without overwriting the new data on existing data in the data storing section when the result of detecting indicates absence of the enabler key continuously from startup of the apparatus, and stopping the apparatus when the result of detecting is a change from presence of the enabler key to absence of the enabler key after startup of the apparatus.

9. The method of claim 8, further comprising:
displaying an indication to call for a serviceman for the apparatus, on a display screen of a control panel, when the result of detecting is a change from presence of the enabler key to absence of the enabler key after startup of the apparatus.

10. The method of claim 8, further comprising:
storing insertion state data indicating an insertion state of the enabler key; and
storing the result of detecting as the insertion state data.

11. The method of claim 10, wherein
the insertion state data comprises first insertion state data indicating that the result of detecting is a presence of the enabler key, second insertion state data indication that the result of detecting is an absence of the enabler key, or third insertion state data indicating that the result of detecting is a change from presence of the enabler key to absence of the enabler key.

12. The method of claim 11, further comprising:
displaying an indication to call for a serviceman for the apparatus, on a display screen of a control panel, when the result of detecting is a change from presence of the enabler key to absence of the enabler key after startup of the apparatus.

13. The method of claim 12, further comprising:
reading the insertion state data at startup of the apparatus;
monitoring a change in the insertion state of the enabler key based on a comparison between the read insertion state data and the result of detecting, overwriting new data, to be stored in the data storing section, on existing data in the data storing section and storing the new data therein when a result of the monitoring indicates a change from absence of the enabler key to presence of the enabler key, storing the new data in the data storing section without overwriting the new data on existing data in the data storing section when the result of the monitoring indicates absence of the enabler key continues from startup of the apparatus, and stopping the apparatus and displaying an indication to call for a serviceman for the apparatus, on the display screen of the control panel, when the result of the monitoring indicates a change from presence of the enabler key to absence of the enabler key.

14. The method of claim 8, wherein
the data storing section is a hard disk drive; and
the enabler key is connected to at least one USB port in a main body of the apparatus.

15. An image forming apparatus comprising:
data storing means for storing data;
detecting means for detecting presence or absence of an enabler key insertable in and removable from the apparatus; and
controlling means for overwriting new data, to be stored in the data storing means, on existing data in the data storing means and storing the new data therein when a result of detection by the detecting means indicates presence of the enabler key, for storing the new data in the data storing means without overwriting the new data on existing data in the data storing means when the result of detection by the detecting means indicates absence of the enabler key continuously from startup of the apparatus, and for stopping the apparatus when the result of detection by the detecting means changes from presence of the enabler key to absence of the enabler key after startup of the apparatus.

16. The apparatus of claim 15, further comprising:
a control panel comprising a display screen, wherein
the controlling means displays an indication to call for a serviceman for the apparatus, on the display screen of the control panel, when the result of detection by the detecting means is a change from presence of the enabler key to absence of the enabler key after startup of the apparatus.

17. The apparatus of claim 15, further comprising:
state storing means for storing insertion state data indicating an insertion state of the enabler key, wherein
the controlling means stores the result of detection by the detecting means in the state storing means as the insertion state data.

18. The apparatus of claim 17, wherein
the insertion state data comprise first insertion state data indicating that the result of detection by the detecting means is presence of the enabler key, second insertion state data indicating that the result of detection by the detecting means is absence of the enabler key, or third insertion state data indicating that the result of detection by the detecting means is a change from presence of the enabler key to absence of the enabler key.

19. The apparatus of claim 18, further comprising:
a control panel comprising a display screen, wherein
the controlling means displays an indication to call for a serviceman for the apparatus, on the display screen of the control panel, when a result of detection by the detecting means changes from presence of the enabler key to absence of the enabler key after startup of the apparatus.

20. The apparatus of claim 19, wherein
the controller means reads the insertion state data from the state storing means at the startup of the apparatus, monitors a change in the insertion state of the enabler key based on a comparison between the read insertion state data and the result of detection by the detecting means, overwrites new data, to be stored in the data storing means, on existing data in the data storing means and stores the new data therein when a monitored result indicates a change from absence of the enabler key to presence of the enabler key, stores the new data in the data storing means without overwriting the new data on existing data in the data storing means when the monitored result indicates absence of the enabler key continues from startup of the apparatus, and stops the apparatus and displays an indication to call for a serviceman for the apparatus, on the display screen of the control panel, when the monitored result indicates a change from presence of the enabler key to absence of the enabler key.

* * * * *